United States Patent Office 3,785,935
Patented Jan. 15, 1974

3,785,935
DISTILLATION PROCESS OF MONOMERS WITH THE ADDITION OF AN ANTIFOAM COMPOSITION
Kermit W. Householder, Tonawanda, N.Y., and Van I. Doesburg, Midland, Mich., assignors to Dow Corning Corporation, Midland, Mich.
No Drawing. Filed May 17, 1971, Ser. No. 144,264
Int. Cl. B01b 1/04
U.S. Cl. 203—20       6 Claims

ABSTRACT OF THE DISCLOSURE

An antifoam composition which consists essentially of (1) 5 to 50 percent by weight of a silicone-glycol copolymer, (2) 5 to 50 percent by weight of a polypropylene glycol, (3) 5 to 50 percent by weight of a glycol copolymer, and (4) 40 to 85 percent by weight of water is disclosed. This composition is particularly useful in latexes.

This invention relates to an antifoam or defoaming composition. More specifically this invention relates to such a composition which consists essentially of (1) 5 to 50 percent by weight of a silicone-glycol copolymer having the general formula $(CH_3)_3SiO\{(CH_3)_2SiO\}_x\{(CH_3)GSiO\}_ySi(CH_3)_3$ wherein $x$ has an average value from 6 to 420, $y$ has an average value from 3 to 30, and G is a radical of the structure $-D(OR)_zA$ wherein D is an alkylene radical, R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2.3:1 to 2.8:1, $z$ has an average value from 10 to 100, and A is a capping group, (2) 5 to 50 percent by weight of polypropylene glycol having an average molecular weight in the range of 1000 to 2000, (3) 5 to 50 percent by weight of a glycol copolymer having the general formula $CH_2=CH-D'_m(OC_2H_4)_a(OC_3H_6)_bR'$ wherein $a$ and $b$ each are integers greater than zero and each has an average value such that the copolymer has an average molecular weight in the range of 2000 to 3000, D' is an alkylene radical containing from 1 to 16 carbon atoms, $m$ is zero or one, and R' is a capping group, and (4) 40 to 85 percent by weight of water.

The depression and/or suppression of foam in many systems is a problem. Each system is unique and requires its own antifoamer or defoamer. And while a particular composition may function well as an antifoam, it may at the same time introduce a new problem. The foregoing is true of latex systems.

It is an object of this invention to provide a new antifoam or defoaming composition which is particularly useful in latexes.

By way of example, during the preparation of styrene-butadiene latexes in emulsion the conversion of monomers to polymers is terminated at about 70 to 75% conversion as higher conversions yield polymers with inferior properties. The unreacted butadiene is generally removed by flashing at atmospheric and then reduced pressures. Finally, the unreacted styrene is removed by steam stripping (distilling) where foaming is a problem. Acrylonitrile-butadiene latexes are made by an analogous process. Other synthetic latexes also present similar foaming problems during preparation. Therefore, another object of this invention is to provide an antifoam composition which can be used in latexes, which composition significantly reduces the foaming problems during preparation.

Another object of this invention is to provide an antifoam composition which can be used in latexes which composition does not cause fisheyeing when the latex is subsequently used in making coating compositions.

Other objects and advantages of this invention will be apparent from the following description and examples.

The first component of the composition of this invention is a silicone-glycol copolymer having the general formula $(CH_3)_3SiO\{(CH_3)_2SiO\}_x\{(CH_3)GSiO\}_ySi(CH_3)_3$ In this copolymer the number of dimethylsiloxane units, as defined by $x$, can range from 6 to 420. Preferably $x$ has an average value from 50 to 100.

The number of methyl-glycol siloxane units in the copolymer is defined by $y$ which can have an average value ranging from 3 to 30 but which preferably falls in the range of 5 to 10.

The glycol portion of the copolymer is designated as G which is defined as a radical of the structure $-D(OR)_zA$.

The glycol is attached to the silicon atom via alkylene radical D which preferably contains from 1 to 18 carbon atoms. Specific examples of D are the methylene, ethylene, propylene, isopropylene, butylene, octylene, decylene, octadecylene and myricylene radicals.

The (OR) portion of the glycol radical defines the alkylene oxide which constitutes the backbone of the glycol. It can consist of ethylene oxide units (R is an ethylene radical and propylene oxide units (R is a propylene radical), ethylene oxide units and butylene oxide units (R is a butylene radical), or ethylene oxide units with propylene oxide units and butylene oxide units. However, the proportion of the ethylene oxide to the other alkylene oxides must be such that the ratio of carbon atoms to oxygen atoms in the total (OR) block ranges from 2.3:1 to 2.8:1. The total number of (OR) groups is defined by $z$ which has an average value from 10 to 100.

The A radical in the glycol portion of the copolymer is a capping group. By way of illustration, the glycol can be hydroxy, acyl, ether or carbonate ester capped. Preferably there is no more than a total of 15 atoms in A.

The silicone-glycol copolymers described above are well known materials with some of them being commercially available. For those unfamiliar with them attention is directed to U.S. Pat. 3,402,192 whose disclosure is incorporated by reference. This patent sets forth typical methods of preparation and a more detailed description of these materials.

The silicone-glycol copolymer can amount to 5 to 50 percent by weight of the total composition. It is preferable, however, that it be present in an amount ranging from 5 to 15 percent.

The second component of the composition of this invention is a polypropylene glycol. These glycols are also commercially available materials. It has been found that in addition to being a polypropylene glycol, the molecular weight must be in the range of 1000 to 2000 with a molecular weight range of 1200 to 1800 being preferred. The amount of this component can also be from 5 to 50, preferably 5 to 15, percent by weight of the total composition.

The third component of the composition of this invention is a glycol copolymer having the general formula $CH_2=CH-D'_m-(OC_2H_4)_a(OC_3H_6)_bR'$ It has been found that in this copolymer $a$ and $b$ each are integers greater than zero and each must have average values such that the average molecular weight of the copolymer is in the range of 2000 to 3000. Preferably the average molecular weight of the copolymer should be in the range of 2200 to 2800.

The D' radical in the glycol is an alkylene radical containing from 1 to 16 carbon atoms and is illustrated by the methylene, ethylene, propylene, butylene, isobutylene, octylene, decylene, dodecylene and hexadecylene radicals. Preferably D' is a methylene or ethylene radical. There can be zero or one D' radical in the glycol, i.e. $m$ can be zero or one.

The R' radical is a capping group and reference is made to A above for illustrations of specific capping groups which can be employed.

The glycol copolymers useful as component three are known materials, can be prepared by known techniques, and are commercially available. While the amount used is preferably 5 to 15 percent it can vary from 5 to 50 percent.

The fourth and final essential component of the composition of this invention is water. It makes up the balance of the composition and ranges in amount from 40 to 85 percent by weight of the total composition. Preferably the amount of water will be in the range of 65 to 75 percent.

So far as is known at this time there is no critical order of mixing the four components of the composition. They can simply be added together with agitation to obtain a relatively homogeneous mixture.

The particular amount of the antifoam composition of this invention to be used for antifoaming purposes varies widely. Such factors as the type of product having the foam problem, the process involved, the equipment being used, and the extent to which one wishes to control the foaming determines the amount used. Thus it is difficult to set any meaningful numerical limitations as to the amount of antifoam composition to be employed. In practice, for example, anywhere from 5 parts of antifoam composition per million parts of composition being defoamed to 5 percent by weight of antifoam composition based on the weight of the composition being defoamed, may be used with satisfactory results depending on the situation.

Now in order that those skilled in the art may better understand how the present invention can be practiced, the following examples are given by way of illustration and not by way of limitation. All parts and percents referred to herein are on a weight basis unless otherwise specified.

EXAMPLE 1

To a 32 ounce bottle there was added 300 ml. of unstripped styrene-butadiene rubber latex. This latex was heated to 90° C. by placing the bottle in a boiling water bath. Then steam was blown through the latex. Shortly after the steam was introduced the unreacted monomers began to distill from the system causing foaming. In two minutes the foam had reached a height of 9 cm. and after four minutes was 5 cm. After the monomers had been stripped from the latex it was allowed to cool to room temperature. It was then filtered by passing it through 100 mesh and 325 mesh screens. The particles removed during filtration were preflock, large amounts of which are undesirable. A 0.003 inch thick film of the filtered latex was cast on a clean glass plate. Less than 5 fisheyes were observed in a 1½" x 7" strip. This control has an undesirable degree of foaming but passed the preflock and fisheye tests.

The above procedure was repeated except that 0.3 cc. of an antifoam composition of this invention was added to the latex just prior to the introduction of the steam. The antifoam composition consisted essentially of 10% of a silicone-glycol copolymer having the formula

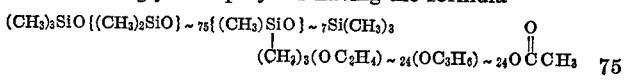

10% of polypropylene glycol having a molecular weight of about 1500, 10% of a glycol copolymer having the formula

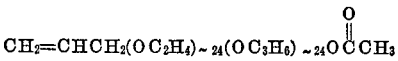

and having a molecular weight of about 2400, and 70% water. In two minutes after the introduction of the steam the foam had reached a height of 6 cm. and after four minutes was 2 cm. The antifoam had significantly reduced the foaming and this composition also passed the preflock and fisheye tests.

EXAMPLE 2

When the above procedure is carried out using acrylonitrile-butadiene rubber latexes, the antifoam composition of this invention reduces the amount of foaming during the monomer stripping, and no preflock or fisheyeing problems are encountered.

EXAMPLE 3

When the antifoam compositions set forth below are substituted for the antifoam composition of Examples 1 and 2, there is a significant reduction in foaming and no preflock or fisheyeing problems are encountered.

(A) A composition consisting essentially of 5% of a silicone-glycol copolymer having the formula

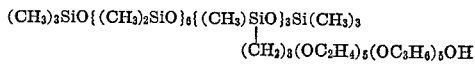

5% of propyleneglycol having a molecular weight of about 1000, 5% of a glycol copolymer having the formula

and having a molecular weight of about 2000, and 85% water.

(B) A composition consisting essentially of 15% of a silicone-glycol copolymer having the formula

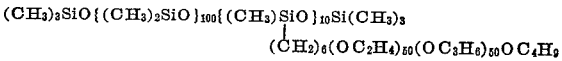

15% of propylene glycol having a molecular weight of about 2000, 15% of a glycol copolymer having the formula $$CH_2=CH(OC_2H_4)_{32}(OC_3H_6)_{30}OC_4H_9$$

and having a molecular weight of about 3000, and 55% water.

(C) A composition consisting essentially of 10% of a silicone-glycol copolymer having the formula

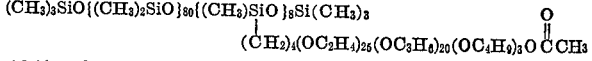

10% of propylene glycol having a molecular weight of about 1600, 10% of a glycol copolymer having the formula

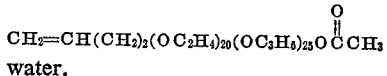

and 70% water.

That which is claimed is:

1. In a process of distilling unreacted monomers from a synthetic latex in which process foaming occurs, the improvement which comprises adding to the latex, prior to the distillation of the unreacted monomers therefrom, the antifoam composition which cosists essentially of (1) 5 to 50 percent by weight of a silicone-glycol copolymer having the general formula $$(CH_3)_3SiO[(CH_3)_2SiO]_x[(CH_3)GSiO]_ySi(CH_3)_3$$

wherein
 $x$ has an average value from 6 to 420,
 $y$ has an average value from 3 to 30, and
 G is a radical of the structure —D(OR)$_z$A
  wherein
   D is an alkylene radical, R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2.3:1 to 2.8:1, $z$ has an average value from 10 to 100, and A is a capping group, (2) 5 to 50 percent by weight of polypropylene glycol having an average molecular weight in the range of 1000 to 2000, (3) 5 to 50 percent by weight of a glycol copolymer having the general formula $$CH_2=CH-D'_m-(OC_2H_4)_a(OC_3H_6)_bR'$$

wherein $a$ and $b$ are integers greater than zero and each has an average value such that the copolymer has an average molecular weight in the range of 2000 to 3000, D' is an alkylene radical containing from 1 to 16 carbon atoms, $m$ is 0 or 1 and R' is a capping group, and (4) 40 to 85 percent by weight of water, whereby the foaming is significantly reduced.

2. The process of claim 1 wherein the latex is a styrene-butadiene latex.

3. The process of claim 1 wherein the latex is an acrylonitrile-butadiene latex.

4. In a process of distilling unreacted monomers from a synthetic latex in which process foaming occurs, the improvement which comprises adding to the latex, prior to the distillation of the unreacted monomers therefrom, the antifoam composition which consists essentially of (1) 5 to 15 percent by weight of a silicone-glycol copolymer having the general formula $$(CH_3)_3SiO((CH_3)_2SiO)_x((CH_3)GSiO)_ySi(CH_3)_3$$

wherein $x$ has an average value from 50 to 100, $y$ has an average value from 5 to 10, and G is a radical of the structure $-D(OR)_zA$ wherein D is an alkylene radical containing from 1 to 18 carbon atoms, R is composed of only ethylene and propylene radicals, the amount of ethylene radicals relative to the propylene radicals being such that the ratio of carbon atoms to oxygen atoms in the total OR block ranges from 2.3:1 to 2.8:1, $z$ has an average value from 10 to 100, and A is selected from the group consisting of hydroxy, acyl, ether, and carbonate ester capping groups, (2) 5 to 15 percent by weight of polypropylene glycol having an average molecular weight in the range of 1200 to 1800, (3) 5 to 15 percent by weight of a glycol copolymer having the general formula $$CH_2=CH-D'_m-(OC_2H_4)_a(OC_3H_5)_bR'$$

wherein $a$ and $b$ each are integers greater than zero and each has an average value such that the copolymer has an average molecular weight in the range of 2200 to 2800, D' is an alkylene radical containing 1 to 16 carbon atoms, $m$ is 0 or 1 and R' is selected from the group consisting of hydroxy, acyl, ether and carbonate ester capping groups, and (4) 65 to 75 percent by weight of water, whereby the foaming is significantly reduced.

5. In a process of distilling unreacted monomers from a synthetic latex in which process foaming occurs, the improvement which comprises adding to the latex, prior to the distillation of the unreacted monomers therefrom, the antifoam composition which consists essentially of (1) 5 to 15 percent by weight of a silicone-glycol copolymer having the general formula

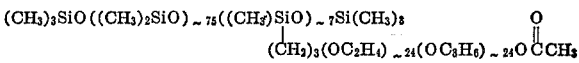

(2) 5 to 15 percent by weight of a polypropylene glycol having an average molecular weight of about 1500, (3) 5 to 15 percent by weight of a glycol copolymer having the general formula

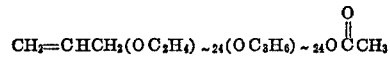

and (4) 65 to 75 percent by weight of water, whereby the foaming is significantly reduced.

6. The process of claim 5 wherein the latex is a styrene-butadiene latex.

References Cited

UNITED STATES PATENTS

| | | | |
|---|---|---|---|
| 3,402,192 | 9/1968 | Haluska | 260—448.2 B |
| 2,782,162 | 2/1957 | Liddell | 203—20 |
| 3,306,341 | 2/1967 | Pugh et al. | 203—20 |

WILBUR L. BASCOMB, JR., Primary Examiner

U.S. Cl. X.R.

203—53; 252—358; 260—29.7

UNITED STATES PATENT AND TRADEMARK OFFICE
CERTIFICATE OF CORRECTION

PATENT NO. : 3,785,935
DATED : January 15, 1974
INVENTOR(S) : KERMIT W. HOUSEHOLDER, ET AL.

It is certified that error appears in the above-identified patent and that said Letters Patent are hereby corrected as shown below:

Column 4, line 65, the word "cosists" should read --consists--.

Column 5, line 18, after "b" insert thereafter --each--.

Column 6, line 8, the formula
"$CH_2=CH-D'_m-(OC_2H_4)_a(OC_3H_5)_b R'$" should read
--$CH_2=CH-D'_m-(OC_2H_4)_a(OC_3H_6)_b R'$--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*